July 21, 1959   F. B. BERGER   2,896,205
MULTIPLE SIDEBAND DOPPLER RECEIVER
Filed Jan. 13, 1954   4 Sheets-Sheet 1

INVENTOR.
FRANCE B. BERGER
BY
ATTORNEY

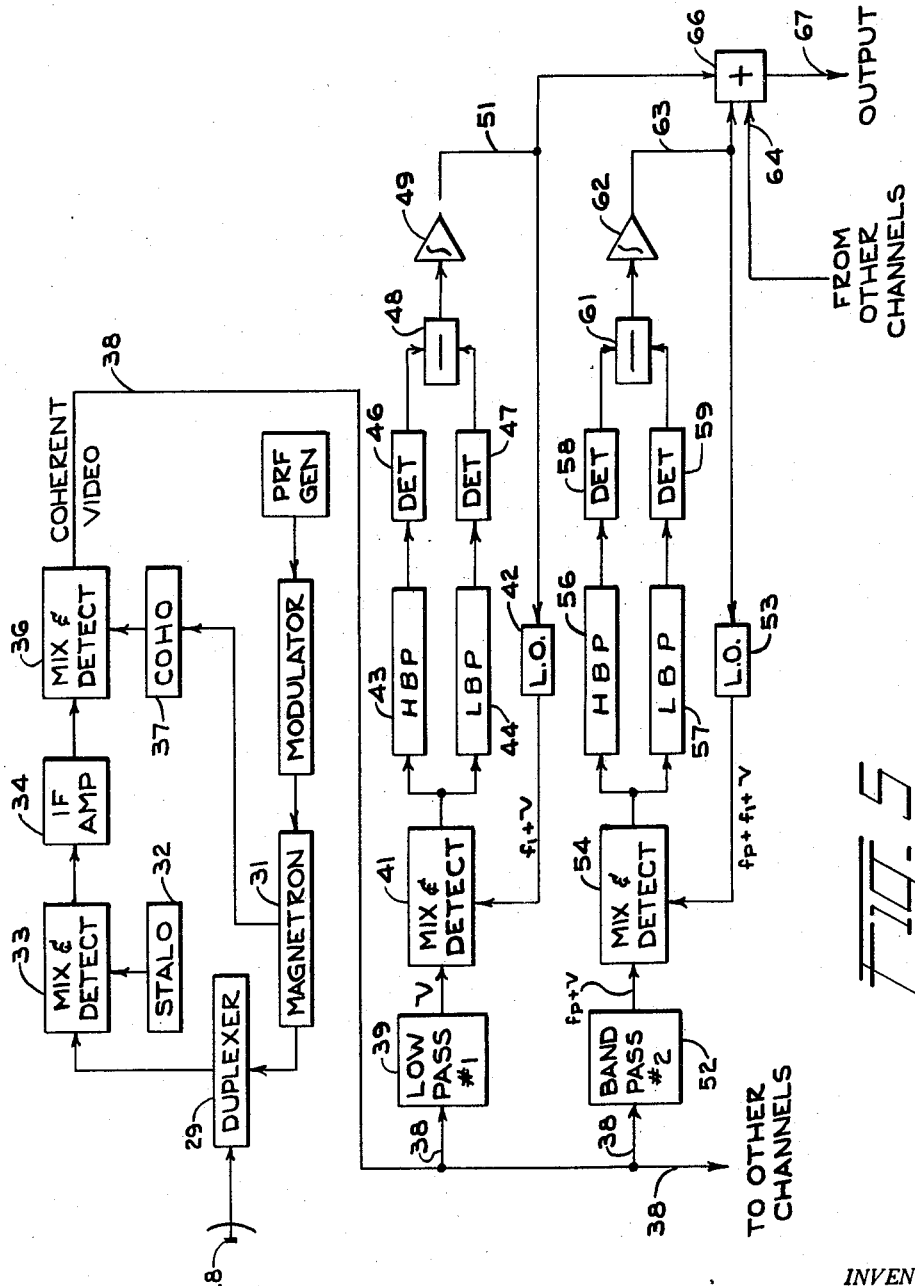

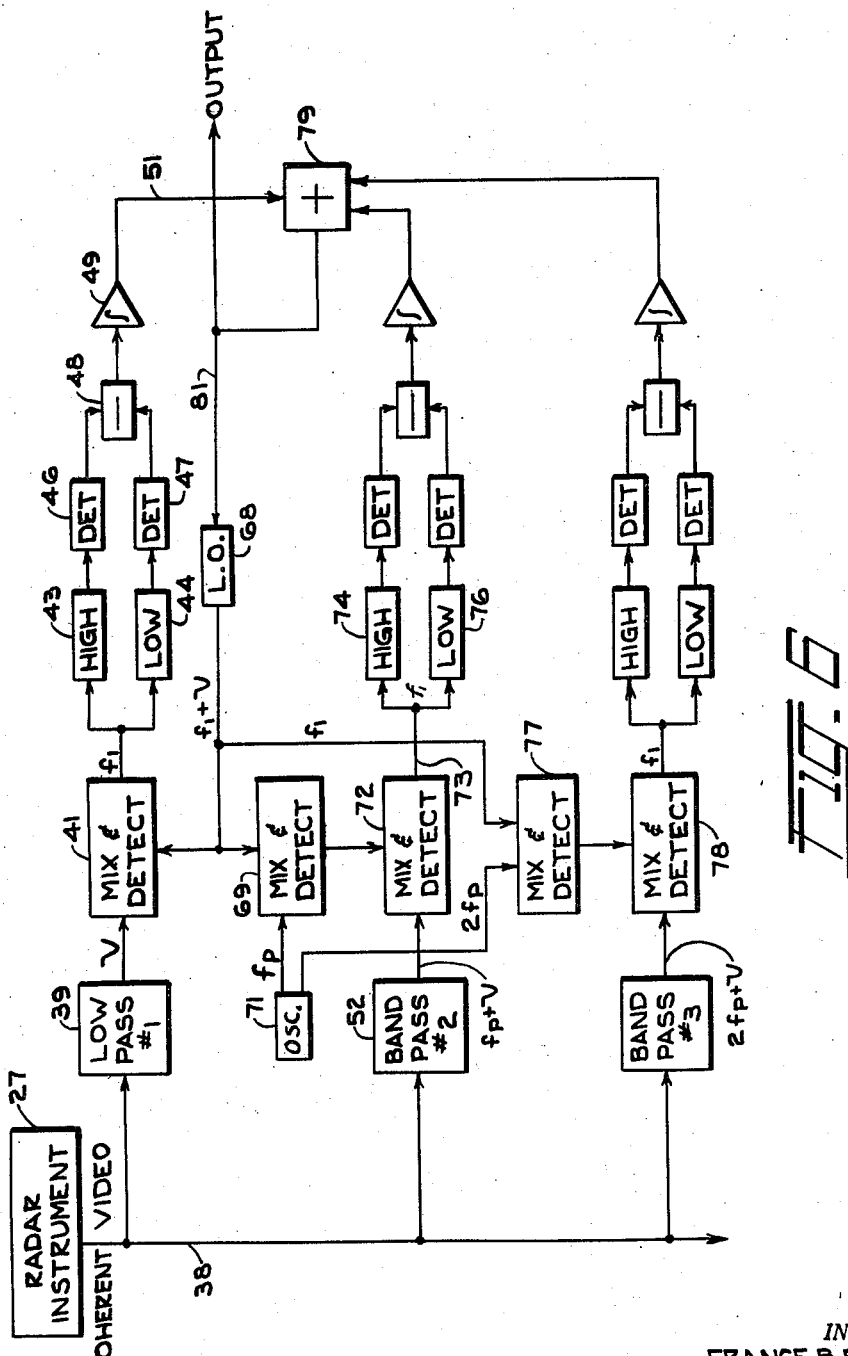

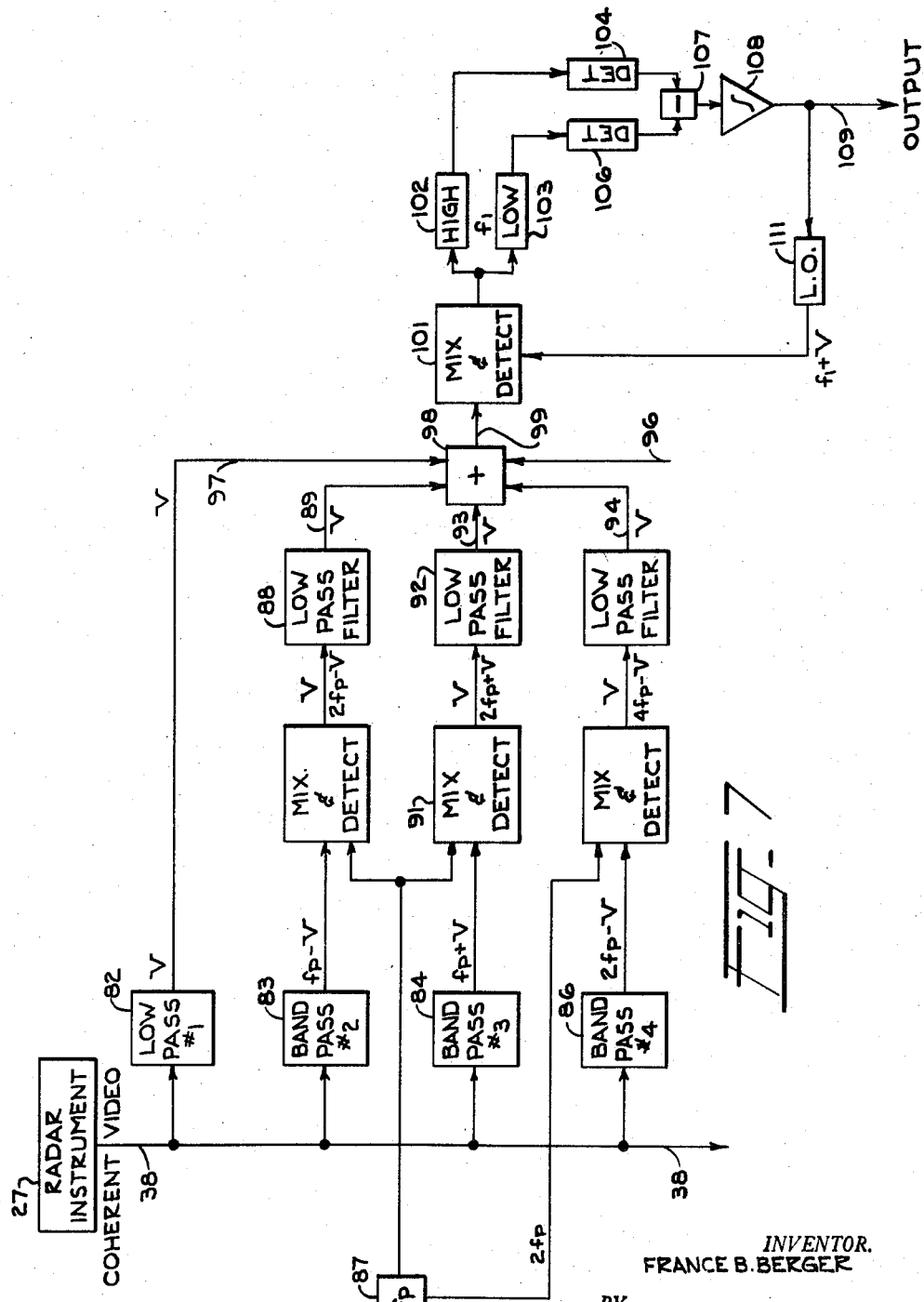

United States Patent Office 2,896,205
Patented July 21, 1959

2,896,205

MULTIPLE SIDEBAND DOPPLER RECEIVER

France B. Berger, Pleasantville, N.Y., assignor to General Precision Laboratory Incorporated, a corporation of New York Application January 13, 1954, Serial No. 403,680

13 Claims. (Cl. 343—17.1)

This invention relates to Doppler pulse radar instruments and more specifically to improvements therein affording increased utilization of Doppler information.

In the operation of microwave Doppler radar, echo signals are received from reflectors which are moving relative to the radar instrument, giving rise to Doppler information in the received signals. The Doppler information is ideally considered to consist of a slight increase or decrease in the microwave frequency of the received signal relative to the transmitted frequency, the amount of increase or decrease being termed the Doppler frequency. By beating the received signal with the transmitted signal, or by an equivalent method, a Doppler frequency potential may be derived. However, it is a characteristic property of pulsed operation that not only the Doppler frequency, but an infinite series of other frequencies is contained in the received signal, all of which frequencies contain substantially the same Doppler information. These frequencies bear the harmonic relation $$F = F_T + (nf_p \pm v) \quad (1)$$

in which F is any one of these frequencies, $F_T$ is the transmitting microwave frequency, $n$ is any integer, $f_p$ is the pulse repetition frequency, and $v$ is the Doppler frequency. The frequencies of F when $n=0$ are the only ones of the received frequencies which are conventionally made use of in Doppler radar.

The instant invention provides means for receiving, interpreting and utilizing several of the received frequencies in addition to those corresponding to $n=0$, thus providing greater utilization of the returned signal and improving radar operation.

The improvement is manifested as an effectively increased signal-to-noise (S/N) ratio. The improvement theoretically can amount to a very great increase, and practically can be made to yield a substantial increase, the difference between theory and practice being due to a law of diminishing returns as additional frequencies are utilized and to the necessity of setting a limit to the multiplication of apparatus.

The purpose of this invention is to provide radar apparatus, for the improved utilization of Doppler information in the return signal.

More specifically the purpose is to provide pulsed radar apparatus to secure a superior signal-to-noise ratio in the utilization of the return signal by employing more than one of the returned microwave power spectrum side bands.

Another purpose of this invention is to provide multichannel radar receiving apparatus for the reception and utilization of the multiple frequencies contained in the received power spectrum resulting from pulsed microwave transmission.

A further understanding of this invention may be secured from the detailed description and drawings, in which:

Figure 5 is a block diagram illustrating one embodiment of the invention.

Figure 6 is a diagram illustrating another embodiment of the invention having a low S/N minimum limit.

Figure 7 is a diagram illustrating another embodiment of the invention requiring only a single frequency discriminator.

Figure 1:
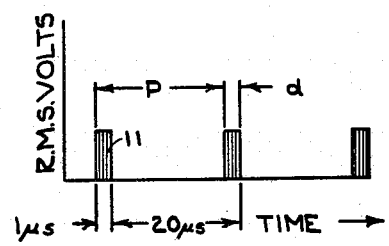
Figure 1 is a graph illustrating radar transmitted pulses.

The pulses used in pulsed microwave radar transmission are plotted in Fig. 1, the abscissae being time and the ordinates R.M.S. voltage. Each pulse such as 11 consists of some 10,000 cycles (in the $x$ band) of microwave energy, having an envelope which has a time duration of, say, 1 microsecond, termed $d$, this envelope being depicted in Fig. 1. The pulse repetition period is termed P and is, for example, 20 μs. By the use of a Fourier's series the signal represented by this graph is replotted in Fig. 2 in terms of amplitude and frequency, $F_T$ being the microwave transmitting frequency and $f_p$ the pulse repetition frequency. The graph consists of an infinite number of vertical lines, the envelope 12 being merely a construction line having no physical existence. The function represented has the value of zero at multiples of $$\frac{1}{d}$$

distant from $F_T$, where the frequency is $$F_T \pm \frac{n}{d}$$

$n$ being any integer. The portion of the graph of most interest is that lying between $$F_T \text{ and } F_T + \frac{n_1}{d}$$

in which $n_1=1$.

Figure 3:
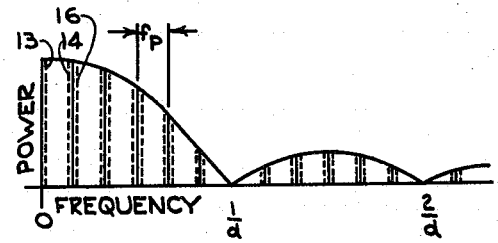
Figure 3 is a power-frequency graph of the train.
Figure 2:
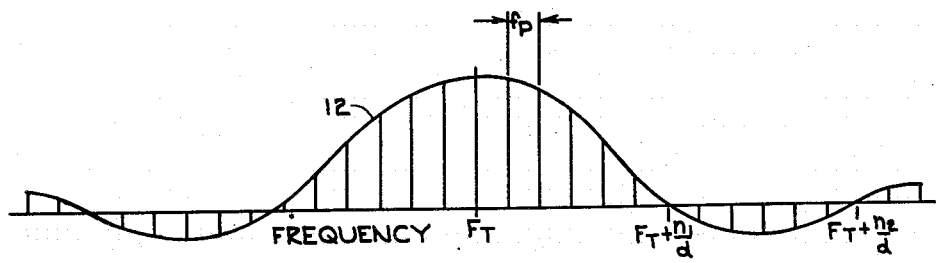
Figure 2 is a potential-frequency graph of the pulse train of Fig. 1.

The graph of Fig. 2 can be converted into one having power as its ordinate scale, Fig. 3, by squaring all of the vertical lines comprising Fig. 2, giving a graph which is always positive.

In a radar receiver the received microwave energy is demodulated, eliminating the microwave frequency, so that $F_T$ becomes zero. The right half of Fig. 2 then represents all of the real frequencies, and is replotted in terms of power and frequency in Fig. 3.

When radar echoes are received from a reflecting body in motion relative to the transmitter the received microwave energy has a lower frequency than the transmitted energy if the relative motion is away from the transmitter, and has a higher frequency if the motion is toward the transmitter. The difference, termed the Doppler modulation frequency, $v$ gives rise to sum and difference terms of this amount in the Fourier power series which are shown in Fig. 3 as pairs of lines flanking each of the transmitted pulse harmonics. In this figure the transmitter pulses are illustrated by solid lines and the received side bands by dashed lines. In the conventional Doppler radar receiver, after demodulating but before filtering, the frequencies represented by the dashed lines have physical existence while the transmitted pulse and its harmonics have existence only because of leakage from the transmitter and through the demodulator. The lowest sideband 13 is the only one which is utilized in the present art.

Figure 4:
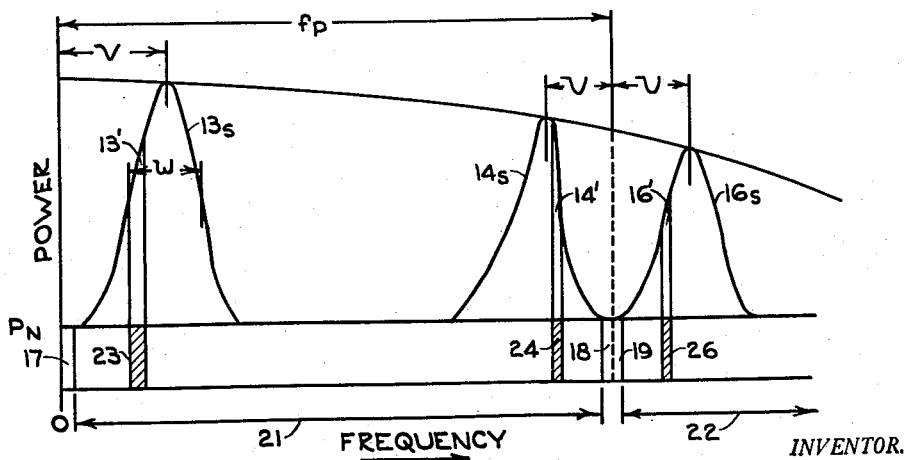
Figure 4 is an enlarged graph of part of the train.

It is conventional in Doppler radar design to eliminate the transmitting pulse and all of its harmonics from the receiver by time gating. This eliminates all of the vertical solid lines of Fig. 3. The first few dashed sideband lines of this graph are replotted in Fig. 4 to a larger scale as frequency bands having approximately Gaussian shape, to conform to the form of such signals as observed. The bandwidth $w$ is approximately 15% of the central frequency shift $v$, as indicated in Fig. 4, for the lobe $13s$, which represents the dashed line 13 of Fig. 3. Similarly the negative and positive sidebands 14 and 16, Fig. 3, accompanying the fundamental or first harmonic of the pulse repetition frequency are shown as bands $14s$ and $16s$ in Fig. 4. In each case the displacement from a multiple of the pulse repetition frequency of the sideband central frequency is $v$.

In the absence of noise there would be no advantage in using more than one of these sidebands, as substantially the same Doppler frequency information is contained in each and the energy contained in any one of the sidebands could be amplified to any desired extent. However, noise always does accompany the reception of Doppler information. In Fig. 4 noise power is indicated as the ordinate $P_N$. A narrow frequency band $13'$ of the zero order sideband $13s$ contains Doppler frequency information above $P_N$ and noise background as indicated by the cross-hatched portion below $P_N$. The term zero order sideband refers to the spectral component or sideband of the echo signal which is the Doppler shifted carrier frequency. Similar narrow bands of the $14s$ and $16s$ sidebands are indicated at $14'$ and $16'$, taken at similar parts of the Doppler spectrum so that if superimposed the Doppler information frequencies contained in these zones would be coherent or in phase. By superimposition is meant the application of a frequency shift, as by heterodyning, to the sideband $16s$ of magnitude $f_p$ so that the frequency of $16s$ would be changed to the frequency of $13s$. Similarily, the sideband $14s$ would be inverted and reduced to the frequency of $13s$. In thus superimposing the signals of these three zones their voltages are added so that the voltage of the Doppler information portion of the composite zone is approximately tripled and its energy content is multiplied by 9. If instead of superimposing the narrow bands $13'$, $14'$ and $16'$ the entire lobes are frequency transformed and superimposed, then similar multiplications of voltage and power are secured. In general, when any number $n$ of sidebands are thus added the total composite voltage is $n$ times that of a single lobe and the corresponding power is $n^2$ times that of a single lobe.

If, when sidebands are thus added together the amplification of the noise power should follow the same law as the amplification of the Doppler information power, no improvement of the S/N ratio would be realized. This, however, is not the case for the reason that the noise powers in the several zones or sidebands are but slightly coherent. That this is so may be seen from a consideration of the following. Nearly all of the noise arises in the receiver itself and therefore when continuous in time is completely random or incoherent throughout any frequency range that may be considered. However, if this noise power be pulsed as the transmitter is pulsed, it will have a Fourier power spectrum exhibiting harmonics, with high coherence among the several sidebands for the same reasons indicating coherence in the Doppler information sidebands. However, when the receiver is time gated only to the extent necessary to eliminate the transmitter pulses the situation is intermediate, and the several zones of noise are only very slightly coherent. The frequency zones of noise 23, 24 and 26 are almost entirely at random phase, or mutually incoherent. If these zones were entirely incoherent, the voltage of their sum would be $\sqrt{3}$ times that of a single zone and the combined power would be 3 times that of one zone. In the addition of $n$ zones or sidebands the total power would be $n$ times that of one zone or sideband. In the present practical case the total power of the noise is therefore approximately $n$ times that of one sideband.

Since the signal power is increased by the factor $n^2$ and the noise power by $n$, the factor of increase of the S/N ratio is $n$. This increase is the basis of the present invention.

One instrumentation for the greater utilization of Doppler information to increase the S/N ratio is indicated in Fig. 5. In this figure the antenna 28 and immediately following components comprise part of a conventional Doppler radar instrument emitting a video signal containing all of the frequencies indicated in Fig. 4 together with higher pulse harmonics and sidebands. Briefly described, the microwave pulses generated by the magnetron 31 are transmitted through the duplexer 29 to the antenna 28 and radiated thereby to a scattering surface. Received echo signals are picked up by the antenna 28 and are mixed with the microwave output of a stable local oscillator 32 in mixer 33. The resulting intermediate frequency potential is amplified in amplifier 34 and beat to zero carrier frequency in mixer 36 by a coherent oscillator 37 timed by magnetron 31 and operating at the intermediate carrier frequency.

The resulting video output is applied through conductor 38 to a low pass filter #1 designated as filter 39. This filter passes a band of frequencies extending from zero to slightly less than one-half the pulse repetition frequency $f_p$, thus passing the sideband $13s$, Fig. 4 and rejecting higher frequencies. This sideband is characterized in that $v$ is its central frequency. This sideband is applied to a mixer 41 where it is beat with an alternating current having a higher frequency $f$ to form two sideband products having frequencies $f+v$ and $f-v$. If, for example, $v=4000$ c.p.s. and $f=24,000$ c.p.s., the product frequencies are 20,000 c.p.s. and 28,000 c.p.s. One of these sideband products is selected and an error signal is developed proportional to the amount by which the frequency of the sideband departs from its nominal value.

This may be done in any one of a number of ways, employing a discriminator or automatic frequency tracker. The essential features of these methods are shown in Fig. 5. A local oscillator 42 operating, for example, at 24,000 c.p.s. is connected to mixer 41. The lower sideband is selected by two band-pass filters 43 and 44 tuned respectively slightly above and below the difference frequency sideband $f_1=f-v$, of 20,000 c.p.s. The filter outputs are demodulated in detectors 46 and 47 and the outputs are subtracted in circuit 48 to provide a direct current signal representing by its voltage the disparity of the output difference frequency of mixer 41 from 20,000 c.p.s. This signal is integrated in amplifier 49 and applied through conductor 51 to control the signal output frequency of local oscillator 42. Change of the signal output frequency of the local oscillator is in such direction as to correct any divergence of the output of mixer 41 from 20,000 c.p.s. The integrated direct-current potential signal in conductor 51 also constitutes the output of the channel, representing by its voltage magnitude the frequency $v$ of the input Doppler radar information.

The same Doppler video signal present in conductor 38 is applied to a number of other channels to secure direct current output signals representing the Doppler information in the sum sidebands, such as sideband $16s$, Fig. 4. The channel for securing information from the sideband $16s$ is provided with filter 52 which is tuned to pass the band of frequencies $16s$, Fig. 4, that is, frequencies from $f_p$ or slightly greater than $f_p$ to nearly 1½ $f_p$. The local oscillator 53 has an output signal frequency $f_p+f_1+v$ so that when this signal beats with the sideband having this frequency $f_p+v$ the difference frequency signal secured from mixer 54 has a frequency $f_1$ as before. This output signal is converted by band-pass filters 56 and 57, detectors 58 and 59, difference circuit 61 and integrating amplifier 62 to a direct-current potential in conductor 63 which controls the local oscillator 53 and also is the channel output, representing by its potential the Doppler frequency $v$.

This procedure can be continued with additional channels to which the conductor 38 is applied and from which output signals 64 are secured, the total number of channel being $n$.

Instead of employing high band pass and low band pass filters such as 43, 44, 56 and 57 in the several channels all designed around the same discrimination frequency $f_1$, with the several local oscillators such as 42 and 53 differing in output signal frequency by $f_p$, $2f_p$, etc., the local oscillators may be made to oscillate at the same frequency and the discriminator filters may be designed for different frequencies. For example, the output of the local oscillator 53 may have the same frequency $f_1+v$ as oscillator 42, and the filters 56 and 57 may have the center frequency $f_p-f_1$. The difference between oscillator frequency $f_1+v$ and the input frequency $f_p+v$ is then $f_p-f_1$, the discriminator frequency.

If the energy contained in sideband 14s is to be employed, which has the central frequency $f_p-v$, then the local oscillator signal frequency is made to have a value $f_p+f_1-v$, and the difference frequency is $f_1$ the design center of the discriminator. This in effect inverts the sideband 14s while beating it to zero carrier frequency. The same principle can be employed to utilize other even sidebands.

Recapitulating, the several discriminator channels of Fig. 5 produce output signals in conductors 51, 63 and 64 which are alike. Each has a magnitude representing the Doppler frequency, each has a statistically similar uncertainty in the Doppler measurement which is caused by the presence of noise, and each has a lower limit of input S/N ratio below which it will not function.

The circuit of Fig. 5 is formed of conventional components and each of the output signals in the several conductors 51, 63 and 64 is no different from that to be expected. However, it has been found that certain advantages result from combining these signals because of the previously described difference in coherence between the Doppler information portions of the signals and the noise portions. One way in which the several channel output signals may be combined is to connect the conductors 51, 63 and 64 to a summing device 66. The output at conductor 67 is a function of the sum and therefore of the arithmetical average of the several channel signals. The uncertainties in the individual signals are neutralized to some extent and the average has a better accuracy by a factor of $\sqrt{n}$.

By a different combination of channels it is possible not only to retain this improvement in accuracy but also to lower the workable S/N ratio limit. A circuit to accomplish this result is illustrated in Fig. 6.

A Doppler radar instrument 27 is similar to that indicated by the antenna 28, Fig. 5, and associated transmitting and receiving equipment such as the magnetron generator and mixing circuits and like it emits a signal containing Doppler information including sidebands having frequencies $v$, $f_p+v$, $f_p-v$, $2f_p+v$, etc. This signal is applied through conductor 38 to a number of channels each including heterodyning mixers, discriminators, the several channels having a common local oscillator 68. The first channel is similar to the first channel of Fig. 5 and similarly numbered, with a direct voltage output signal or conductor 51 having a magnitude representing the frequency $v$. The local oscillator frequency is $f_1+v$, and the difference frequency output $f_1$ of mixer 41 is applied to the discriminator comprising filters 43 and 44 tuned just above and below $f_1$.

The second channel filter 52 passes a frequency spectrum centered at $f_p+v$. In order to be able to employ the same local oscillator for this channel the output of the oscillator 68 is applied to a mixer 69 to which a potential having the frequency $f_p$ is also applied. This potential is secured from an oscillator 71 having a number of output frequencies bearing harmonic relation, the several outputs being combined in a single circuit or being in separate circuits as required by the design of the system. The mixer 69 multiplies the inputs from oscillators 68 and 71, so that the sum product frequency is therefore $f_p+f_1+v$. This sum product signal is subtracted in mixer 72 from the output of bandpass filter 52 to form an output in conductor 73 having the frequency $f_1$, which is applied to filters 74 and 76 having this design center frequency.

The third channel utilizes the input sideband $2f_p+v$, and an output from oscillator 71 having the second harmonic frequency $2f_p$ is employed. When this output is combined with the local oscillator output in the mixer 77 an output having the frequency $2f_p+f_1+v$ is produced, and the difference output of mixer 78 is again $f_1$.

It is obvious that the functions of mixers 69 and 72 may be combined in a single mixer and similar combination may be made of mixers 77 and 78, as well as in all other channels.

As an alternative the oscillator 71 having outputs which are harmonics of the frequency $f_p$, may be eliminated if desired and each discriminator filter set may be tuned to a different frequency which will be in general $(n-1)f_p+f_1$, in which $n$ is the number of the channel.

The several output signals of the channels are applied to an adding circuit 79 and the output thereof is the output of the entire instrument. In these respects this circuit is similar to that of Fig. 5 and the output has the same virtue of being more accurate than that of an individual channel.

In addition, however, the circuit of Fig. 6 will operate on signals of lower S/N ratio than will the circuit of Fig. 5 for the reason that the output of adding circuit 79 which has improved precision is applied through conductor 81 to the common local oscillator 68. This oscillator is therefore more accurately controlled than are any of the local oscillators of the embodiment of Fig. 5, and in effect will operate with a requirement for a shorter integration time because of improved control. This is tantamount to the application of an input signal having an improved S/N ratio, and enables the instrument to operate to actual lower S/N ratios of the input signal than the circuit of Fig. 5.

A third embodiment of this invention is shown in Fig. 7, in which signals representing the energies in the several sidebands of Fig. 4 are combined before application to a frequency discriminating device. This modification retains the advantages of the circuit of Fig. 6 yet requires the use of only one discriminating device.

A radar antenna and associated transmitting and receiving equipment 27 applies an output video signal to conductor 38 containing all of the sideband products of the Doppler frequency difference $v$ and the harmonics of the pulse repetition frequency $f_p$. The conductor 38 is connected to a lowpass filter 82 which passes frequencies up to about $\frac{1}{2} f_p$. A second filter 83 passes a frequency band between $\frac{1}{2} f_p$ and $f_p$, a third filter 84 passes a frequency band between $f_p$ and $3/2 f_p$, and a fourth filter 86 passes a frequency band between $3/2 f_p$ and $2 f_p$. Additional filters covering other sideband ranges may be likewise connected to conductor 38.

The output of filter 83 is mixed with the output of oscillator 87 having the frequency $f_p$, producing signals having the difference frequency $v$ and the sum frequency $2 f_p-v$. The signal having the latter frequency is removed by low pass filter 88, leaving only a signal of frequency $v$ in the output conductor 89.

Similarly, the output of filter 84 is mixed in mixer 91 with the oscillator output having the frequency $f_p$ to form output signals having frequencies $v$ and $2 f_p+v$. The signal having the latter frequency is removed by filter 92 so that only the signal whose frequency is $v$ appears at conductor 93. Similarly, the input signal of frequency $2f_p-v$ when beat with the signal whose frequency is $2f_p$ produces two signals one of which has a frequency $v$ which is isolated and appears on conductor 94. Other input channels connected to conductor 38 similarly are each made to yield an alternating current output signal having the frequency $v$. All of these additional output signals appear on output conductors represented by the conductor 96.

The output signals on conductors 89, 93, 94, 96 and 97 are coherent with regard to the portions representing Doppler intelligence, and largely incoherent with regard to the portions representing noise. Therefore, if averaged both the accuracy of the Doppler intelligence and the S/N ratio are increased over the accuracies obtained in any single channel for the same reasons as explained in connection with the embodiments of Figs. 5 and 6. These signals are added in a summing circuit 98, the output representing their sum and consisting of a spectrum of frequencies in conductor 99 whose central frequency is $v$ having superior accuracy and S/N ratio.

This signal in conductor 99 is applied to a discriminator channel comprising a mixer and detector 101 in which the signal is heterodyned by mixing with a signal whose frequency is $f_1+v$ to form a signal having a frequency $f_1$. This signal is discriminated by means of high and low filters 102 and 103, detectors 104 and 106, and subtracting circuit 107 to form a direct-current error signal. The error signal in turn controls an integrating amplifier 108 to form a direct potential output at conductor 109 whose magnitude is representative of the frequency $v$. This potential is also applied to control the frequency of oscillation of a local oscillator 111 so that its output has a frequency $f_1+v$ for application to mixer 101.

The output of the instrument appearing at conductor 109 therefore has the same superiority of accuracy and the instrument has the same ability to operate on signals of low S/N ratio as that described in connection with Fig. 6.

What is claimed is:

1. A pulsed radar instrument for determining the Doppler frequency difference between transmitted pulse signals and the reflected echo signals thereof comprising, means for obtaining a series of coherent video pulse signals each of which contains Doppler frequency information from said echo signals, a plurality of signal channels each having said series of coherent video pulse signals impressed thereon, a band-pass filter in each of said channels, said band-pass filters passing frequency bands which differ from each other by progressive multiples of the repetition frequency of the transmitted pulse signals, oscillator means generating signals of selected frequencies, mixing means in each of said channels having a signal produced by said oscillator means and the output of a respective band-pass filter impressed thereon, means for deriving output signals from each of said mixers which are indicative of the Doppler frequency difference, and means for summing said output signals to obtain the average thereof.

2. A pulsed radar instrument for determining the Doppler frequency difference between transmitted pulse signals and the reflected echo signals thereof comprising, means for obtaining a series of coherent video pulses containing Doppler frequency information derived from said echo signals, a plurality of signal channels each having said series of coherent video pulses impressed thereon, a band-pass filter in each of said channels, said band-pass filters passing frequency bands which differ from each other by the algebraic sum of progressive multiples of the pulse repetition frequency of the transmitted signals and the Doppler frequency difference, oscillator means generating signals of selected frequencies, a mixer in each of said channels having a signal produced by said oscillator means and the output of a respective band-pass filter impressed thereon, means for deriving output signals from each of said mixers which are indicative of the Doppler frequency difference, and means for developing from the output of said last-named means an average Doppler frequency difference signal.

3. A pulsed radar instrument for determining the Doppler frequency difference between transmitted pulse signals and the reflected echo signals thereof comprising, means for obtaining a series of coherent video pulse signals each of which contains Doppler frequency information from said echo signals, means for segregating said video pulse signals into a plurality of discrete signal portions lying in different frequency bands which are functions of the repetition frequency of the transmitted pulse signals, means for producing direct current potentials from each of said discrete signal portions the amplitude of which is proportional to the Doppler frequency difference of a respective signal portion, and means for obtaining an average of said direct current potentials.

4. A pulsed radar instrument for determining the Doppler frequency difference between transmitted pulse signals and the reflected echo signals thereof comprising, means for obtaining a series of coherent video pulse signals each of which contains Doppler frequency information from said echo signals, a plurality of signal channels each having said series of coherent pulse signals impressed thereon, a band-pass filter in each of said channels, said band-pass filters passing frequency bands which differ from each other as functions of the repetition frequency of the transmitted pulse signals, means in each channel for producing a direct current potential having a magnitude representative of the Doppler frequency difference of the signal transmitted by the band-pass filter of that channel, and summation means having the direct current potentials of said channels impressed thereon for obtaining an average potential magnitude therefrom.

5. A pulsed radar instrument for determining the Doppler frequency difference between transmitted pulse signals and the reflected echo signals thereof comprising, means for obtaining a series of coherent video pulse signals each of which contains Doppler frequency information from said echo signals, a plurality of signal channels each having said series of coherent pulse signals impressed thereon, a band-pass filter in each of said channels, said band-pass filters passing frequency bands which differ from each other as a function of the repetion frequency of the transmitted pulse signals, oscillator means generating signals of selected frequencies, mixing means in each of said channels having a signal produced by said oscillator means and the output of a respective band-pass filter impressed thereon, means in each of said channels for producing a direct current potential the magnitude of which is representative of the Doppler frequency difference contained in the output of a respective mixing means and means for summing said direct current potentials to obtain an average thereof.

6. A pulsed radar instrument as set forth in claim 5 including means for controlling said oscillator means by the average of said direct current potentials.

7. A pulsed radar instrument for determining the Doppler frequency difference between transmitted pulse signals and the reflected echo signals thereof comprising, means for obtaining a series of coherent video pulses containing Doppler frequency information derived from said echo signals, a plurality of signal channels each having said series of coherent video pulses impressed thereon, a band-pass filter in each of said channels, said band-pass filters passing frequency bands which differ from each other by the algebraic sum of progressive multiples of the pulse repetition frequency of the transmitted signals and the Doppler frequency difference, oscillator means, a mixer in each of said channels having a signal produced by said oscillator means and the output of a respective band-pass filter impressed thereon, frequency discrimination means in each of said channels having the output of a respective mixer impressed thereon and producing therefrom a signal indicative of the Doppler frequency difference, and means for averaging the output signals of said frequency discriminator means to obtain an average Doppler frequency difference signal.

8. A pulsed radar instrument for determining the Doppler frequency difference between transmitted pulse signals and the reflected echo signals thereof comprising, means for obtaining a series of coherent video pulse signals each of which contains Doppler frequency information from said echo signals, a plurality of signal channels each having said series of coherent pulse signals impressed thereon, a band-pass filter in each of said channels, said band-pass filter passing frequency bands which differ from each other as functions of the repetition frequency of the transmitted pulse signals, an oscillator in each channel, mixing means in each channel having the output of a respective oscillator and the signal transmitted by a respective band-pass filter impressed thereon and producing a difference signal therefrom, means in each of said channels for producing a direct current potential the magnitude of which is representative of the Doppler frequency difference of the signal transmitted through that channel, means for controlling the output signal frequency of each respective oscillator by the direct current potential developed in each respective channel, and means for obtaining the average of said direct current potentials.

9. A pulsed radar instrument for determining the Doppler frequency difference between transmitted pulse signals and the reflected echo signals thereof comprising, means for obtaining a series of coherent video pulses containing Doppler frequency information derived from said echo signals, a plurality of signal channels each having said series of coherent video pulses impressed thereon, a band-pass filter in each of said channels, said band-pass filters passing frequency bands which differ from each other by the algebraic sum of progressive multiples of the pulse repetition frequency of the transmitted signals and the Doppler frequency difference, a local heterodyning oscillator in each of said channels having an output signal frequency equal to the algebraic sum of a selected intermediate frequency and the channel pass frequency, an electronic mixer in each of said channels having a signal produced by a respective local heterodyning oscillator and a respective band-pass filter impressed thereon, a frequency discriminator in each of said channels having the heterodyned output of a respective electronic mixer impressed thereon and producing a channel utilization signal, means for controlling a respective local heterodyning oscillator by a respective channel utilization signal, and means for averaging said channel utilization signals to produce an output signal representing the average Doppler frequency difference.

10. A pulsed radar instrument for determining the Doppler frequency difference between transmitted pulse signals and the reflected echo signals thereof comprising, means for obtaining a series of coherent video pulses containing Doppler frequency information derived from said echo signals, a plurality of signal channels each having said series of coherent video pulses impressed thereon, a band-pass filter in each of said channels, said band-pass filters passing frequency bands which differ from each other by the algebraic sum of progressive multiples of the pulse repetition frequency of the transmitted signals and the Doppler frequency difference, a heterodyne oscillator having a plurality of output energy frequencies equalling the pulse repetition frequency and multiples thereof, a local oscillator having a frequency equal to a selected intermediate frequency augmented by the Doppler frequency difference, mixing means in each of said channels having a signal produced by said local oscillator, a signal produced by said heterodyne oscillator and the output of a respective band-pass filter impressed thereon, frequency discriminator means in each of said channels having as a design center said selected intermediate frequency for deriving from a respective mixer means a utilization signal indicative of the Doppler frequency difference, means for averaging said utilization signals, and means for applying the averaging means output to control the signal output frequencies of said local oscillator.

11. A pulsed radar instrument for determining the Doppler frequency difference between transmitted pulse signals and the reflected echo signals thereof comprising, means for obtaining a series of coherent video pulse signals each of which contains Doppler frequency information from said echo signals, a plurality of signal channels each having said series of coherent pulse signals impressed thereon, a band-pass filter in each of said channels, said band-pass filters passing frequency bands which differ from each other by the algebraic sum of progressive multiples of the pulse repetition frequency of the transmitted signals and the Doppler frequency difference, means in each of said channels for deriving a Doppler frequency difference signal from the signal transmitted through a respective channel and means for obtaining average Doppler frequency difference signal from the several Doppler frequency difference signals produced in said plurality of channels.

12. A pulsed radar instrument as set forth in claim 11 including means for producing a direct current signal whose magnitude is proportional to the frequency of said average Doppler frequency difference signal.

13. A pulsed radar instrument for determining the Doppler frequency difference between transmitted pulse signals and the reflected echo signals thereof comprising, means for obtaining a series of coherent video pulses containing Doppler frequency information derived from said echo signals, a plurality of signal channels, each having said series of coherent video pulses impressed thereon, a band-pass filter in each of said channels, said band-pass filters passing frequency bands which differ from each other by the algebraic sum of progressive multiples of the pulse repetition frequency of the transmitted signals and the Doppler frequency difference, local heterodyning oscillator means, an electronic mixer in each of said channels having a signal produced by said local heterodyning oscillator means and the output of a respective band-pass filter impressed thereon, means in each of said channels having the output of a respective mixer impressed thereon and producing therefrom utilization signals having an electrical quality which is representative of the Doppler frequency difference, an averaging circuit having said utilization signals applied thereto, a local oscillator, a modulator having the output of said averaging circuit and a signal produced by said local oscillator impressed thereon, and frequency discrimination means for deriving from said modulator an integrated signal representative of said Doppler frequency difference.

References Cited in the file of this patent

UNITED STATES PATENTS

| 2,416,895 | Bartelink | Mar. 4, 1947 |
| 2,422,133 | Sanders | June 10, 1947 |
| 2,455,639 | Anderson | Dec. 7, 1948 |
| 2,629,049 | Miller et al. | Feb. 17, 1953 |